(12) United States Patent
Gamez-Rumpf et al.

(10) Patent No.: US 6,174,557 B1
(45) Date of Patent: Jan. 16, 2001

(54) INSTANT PARTICULATE DRY MIX COMPOSITION FOR PRODUCING A CAPPUCCINO BEVERAGE HAVING A MARBLED FOAM

(75) Inventors: Alexandra G. Gamez-Rumpf, Aying (DE); Satwinder Singh Panesar, Banbury (GB)

(73) Assignee: Kraft Foods, Inc., Northfield, IL (US)

( * ) Notice: Under 35 U.S.C. 154(b), the term of this patent shall be extended for 0 days.

(21) Appl. No.: 09/232,141

(22) Filed: Jan. 15, 1999

(51) Int. Cl.⁷ ............................... A23F 5/00; A23L 1/221
(52) U.S. Cl. ................. 426/594; 426/650; 426/569; 426/570
(58) Field of Search .................... 426/594, 650, 426/569, 570

(56) References Cited

U.S. PATENT DOCUMENTS

| | | | |
|---|---|---|---|
| 4,438,147 | 3/1984 | Hedrick | 426/570 |
| 4,746,527 | 5/1988 | Kuypers | 426/569 |
| 4,748,040 | 5/1988 | Kuypers | 426/569 |
| 5,721,003 | 2/1998 | Zeller | 426/570 |
| 5,741,538 * | 4/1998 | Stipp et al. | |
| 5,780,092 | 7/1998 | Agbo et al. | 426/569 |

FOREIGN PATENT DOCUMENTS

| | | |
|---|---|---|
| 4407361 | 9/1995 | (DE). |
| 2301015 | 4/1997 | (GB). |

* cited by examiner

Primary Examiner—Anthony J. Weier
(74) Attorney, Agent, or Firm—Thomas A. Marcoux

(57) ABSTRACT

An instant particulate dry mix composition produces a cappuccino beverage having surface foam with a marbled appearance upon reconstitution in water. The dry mix composition is made by freeze drying the coffee extract to produce granules having an outer surface layer which is rapidly soluble and a larger inner core layer which is slowly soluble.

8 Claims, 3 Drawing Sheets

|—————|
20 microns 500 microns 100 microns

|—————|
500 microns

|————|
100 microns

|———————|
20 microns

INSTANT PARTICULATE DRY MIX COMPOSITION FOR PRODUCING A CAPPUCCINO BEVERAGE HAVING A MARBLED FOAM

FIELD OF THE INVENTION

The present invention relates to an instant particulate dry mix composition which, upon addition of water, produces a cappuccino beverage having a foamed upper surface which is marbled in appearance, and to a method of producing the dry mix composition.

BACKGROUND OF THE INVENTION

Authentic cappuccino from a machine is made by adding foamed milk to black coffee thereby creating a white foam on the surface of the coffee. The foam becomes brown as sugar is stirred into the beverage. The degree of brownness of the foam may depend on how the drink is stirred and may range from a streaky marbled appearance to completely brown.

In contrast to the appearance of an authentic cappuccino, cappuccinos prepared from instant powders as presently marketed typically do not form a white foam. Rather, a uniformly colored brown foam forms immediately upon reconstitution due not only to stirring, but also as a result of the fine coffee powder dissolving in the liquid between the foam bubbles.

In contrast to most instant cappuccino powders, U.K. Patent No. GB 2,301,015 discloses an instant cappuccino powder in which the foam remains substantially white. Maintaining the white foam color is achieved by delaying solubility of the coffee powder for about 5 to 10 seconds after addition of water. In order to create such delayed solubility, the coffee particles are coated with a coating which reduces solubility in water, such as coatings based on carbohydrates, proteins and fats.

The substantially white foam which results upon reconstitution of the soluble coffee beverage of G.B. 2,301,015 is not necessarily desirable since consumer research shows that, with respect to instant cappuccino powders, consumers significantly prefer a powder which, when reconstituted in water, forms a beverage having a foam with a non-uniform color, i.e., a marbled appearance, rather than a uniform brown or uniform white color.

It is an object of the present invention to provide an instant particulate dry mix beverage composition for producing a cappuccino beverage having surface foam with a marbled appearance which simulates the marbled appearance of authentic cappuccino, and to provide a method of preparation of the composition. The term "marbled" as used herein to describe the surface foam produced on cappuccino beverages prepared from the present dry mix compositions means that the foam includes brown streaks, swirls or points at the surface of a yellowish brown to white foam background.

SUMMARY OF INVENTION

The foregoing and other objects which will be apparent to those of ordinary skill in the art, are achieved in accordance with the invention by providing an instant dry mix particulate coffee beverage composition for producing a cappuccino beverage having a surface foam having a marbled appearance, the composition comprising a particulate foaming creamer, and freeze-dried coffee granules having an outer surface layer which is rapidly soluble and a larger inner core layer which is slowly soluble, and by providing a method of preparing the instant dry mix particulate coffee beverage composition comprising dry mixing the particulate foaming creamer and the freeze-dried coffee granules. Preferably the freeze-dried coffee granules are prepared by deaerating and then freezing a coffee extract containing at least 55% coffee solids. The frozen comminuted granules are then dried using a relatively slow drying process which holds water in the granules for a longer period of time than conventional freeze-drying methods to obtain granules having a density from 0.3 to 0.45 g/cc.

DESCRIPTION OF PREFERRED EMBODIMENTS

Figure 1:
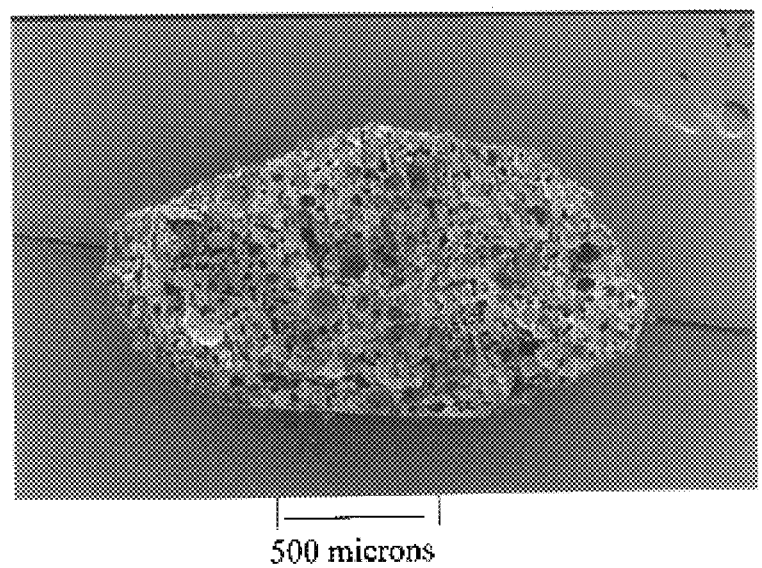
FIG. 1 is a magnified perspective view of a coffee granule manufactured using conventional freeze drying techniques.

The freeze-dried granular soluble coffee component of the dry mix composition includes granules having a density of at least 0.3 g/cc and preferably from 0.3 to 0.45 g/cc. The freeze dried granules are prepared by freeze drying a coffee extract concentrate containing at least 55% coffee solids. Freeze drying may be carried out using equipment suitable for conventional freeze drying of coffee but under conditions which differ from conditions employed in conventional preparation of freeze-dried coffee, and which result in a dense product having an outer surface layer characterized by elongate voids extending generally perpendicularly to the surface of the granule and a larger inner core layer characterized by a glassy structure with a few large voids. This structure, which creates a "localized dissolution" of the coffee granules, is believed to be responsible for the marbled and non-uniform color effect which is characteristic of the surface foam of cappuccino beverages prepared from the present dry mix compositions. Specifically, when heated water is added to the present dry mix cappuccino formulation, the outer surface layer dissolves rapidly, i.e., within seconds, resulting in the formation of brown streaks, swirls, etc. in the foam which create the marbled appearance. The inner core layer dissolves slowly into the liquid, rather than the foam, the entire dissolution process requiring at least 20 seconds.

According to the method of the invention, a freeze-dried coffee powder is obtained by first de-aerating an aqueous coffee extract, then freezing the de-aerated coffee extract to produce slabs of frozen coffee extract. The frozen coffee extract is then ground into granules and the granules are freeze dried to produce freeze-dried coffee granules having a density of at least 0.3 g/cc.

The aqueous coffee extract utilized in the method of the invention preferably contains at least 55% and up to about 70% of coffee, and preferably 60 to 70%.

These percentages, and all percentages herein, are percentages by dry weight of the relevant component, unless stated to the contrary. The extract may be obtained in any convenient manner such as by conventional extraction of roasted and ground coffee, by reconstituting coffee powder, such as spray dried or freeze-dried coffee, in warm water (40–100° C.), or by adding coffee powder to a coffee extract having a lower concentration, such as an extract from a coffee extraction battery used for making instant coffee and having a concentration of 42–48%. The coffee component can be derived from any type of coffee beans such as Robustas and Arabicas. The coffee may be decaffeinated or caffeine-containing and may be obtained by a single extraction or from a plurality of separate extractions of roasted and ground coffee or from combinations of the foregoing.

The coffee extract is first passed through an aerator to devoid it of entrapped air. This may be accomplished, for example, by pumping the extract through a Versator (manufactured by Cornell) at a pressure of about 6 bar. After de-aeration, the temperature of the extract which is typically at about 20–80° C. is reduced to −5° C., by passing it through a scrapped surface heat exchanger or the like. The de-aerated extract is then frozen into slabs, preferably to a temperature of about −40 to −50° C.

Freezing is preferably effected by depositing the de-aerated coffee extract on a freezing belt and then air blasting the belt from top and bottom or by brine freezing from the bottom. Preferred freezing rates vary between 0.5 to 5° C./minute at 0.5 mbar pressure.

The frozen extract is comminuted into granules and then sieved into a particle size ranging from about 0.5 to 3 mm in diameter, preferably 1–2 mm in diameter. Conventional grinders, such as a Fitzmill grinder, are suitable.

The frozen granules are placed in trays in a freeze drier where they are then freeze-dried. Freeze-drying may be carried out in conventional equipment for freeze-drying of coffee, such as an Atlas or Leybold drier.

Drying conditions to achieve the present high density granules require a generally lower drying temperature and a longer drying time than for conventional freeze drying of coffee. Pressure is suitably 0.1 to 0.8 millibars and more preferably about 0.5 millibars. These pressures, and other pressures referred to herein, are absolute pressures unless stated to the contrary. Drying time is also dependent on the solids concentration of the initial extract, with generally more time required for drying frozen granules prepared in accordance with the invention from extracts with a lower coffee solids content. In a typical process, drying of frozen granules prepared from a 60% coffee solids extract may be effected at 50–90° C., preferably at 60° C. from 7–8 hours at 0.1 to 0.8 millibars.

The resultant coffee powder comprises granules each having a density of 0.3 to 0.45 g/cc and having an outer surface layer with elongate voids running perpendicular to the surface of the granule and an inner core layer with a glassy structure. In contrast, freeze-dried coffee granules prepared in accordance with conventional freeze drying methods typically will have a density of about 0.18 to 0.3 g/cc and will not have the two layer structure characteristic of the present product. These conventional freeze-dried coffees when combined with a coffee whitener and then reconstituted in water, create a uniformly colored brown foam.

Figure 2:
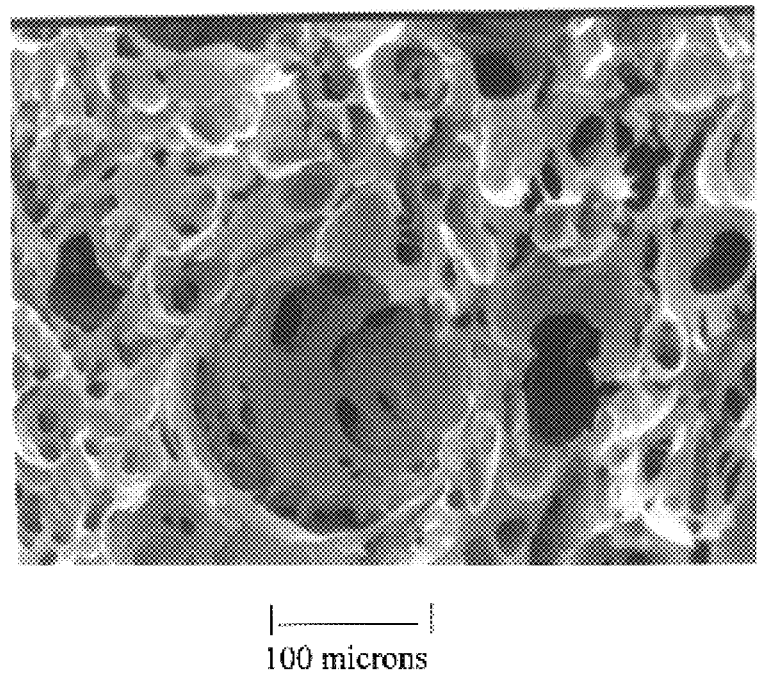
FIG. 2 is a view of the surface of the granule shown in FIG. 1 at higher magnification.
Figure 3:
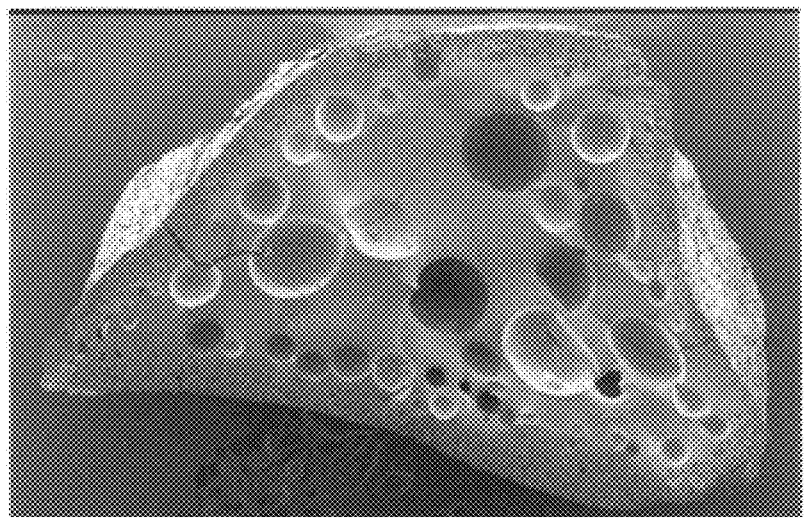
FIG. 3 is a magnified perspective view of a cross-section of a freeze-dried coffee granule prepared in accordance with the method of the invention.
Figure 4:
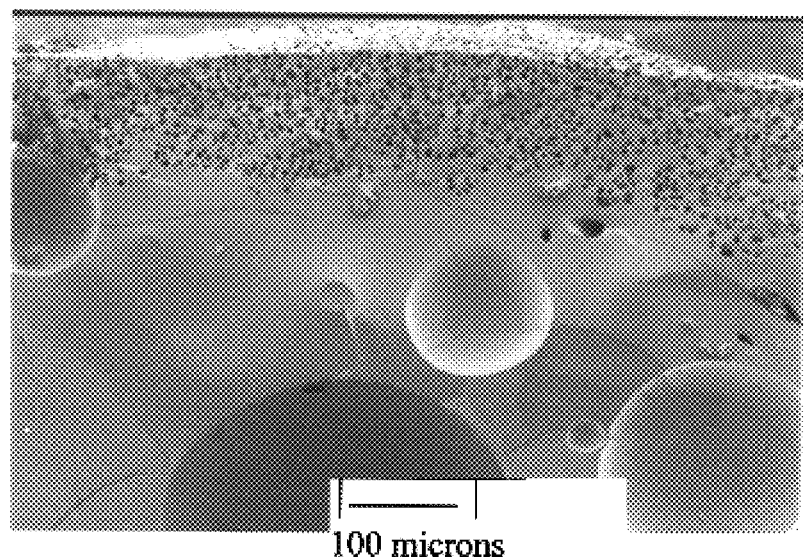
FIG. 4 is a cross-sectional view showing the outer surface layer and inner core layer of the granule shown in FIG. 3 at higher magnification.
Figure 5:
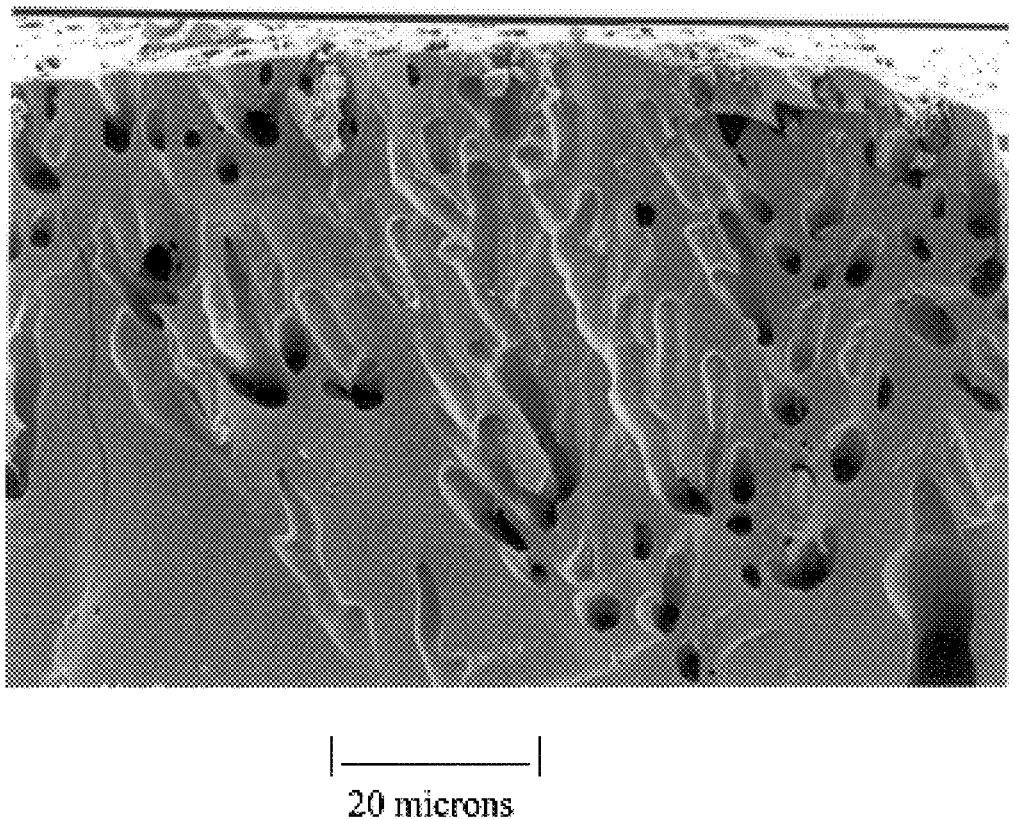
FIG. 5 is a cross-sectional view showing the outer surface layer of the granule shown in FIG. 4 at higher magnification.

As is apparent from a comparison of FIGS. 1 and 2 with FIGS. 3, 4 and 5, the structure of the granules of the invention is completely different from the conventional freeze dried product. The conventional freeze dried product structure is elucidated by scanning electron micrographs ("SEM") as shown in FIGS. 1 and 2. Specifically, FIG. 1 shows a whole coffee granule prepared in accordance with conventional freeze-drying methods while FIG. 2 shows the surface of the same granule at higher magnification. The granule contains voids due to gas bubbles of size range between 20–150 microns and due to ice crystals of size range between 5–50 microns, with both types of voids being consistent throughout the granule. These voids provide a network for water absorption to enhance coffee dissolution in water.

The structure of granules of the invention is shown in FIGS. 3, 4 and 5. Specifically, FIG. 3 shows a magnified cross-section of a freeze-dried coffee granule prepared in accordance with the method of the invention and FIG. 4 shows a view of the granule at higher magnification. The large void in the center, sized 1 mm×0.5 mm vs. 3 mm×2 mm for the whole granule, results from the accumulation of the water vapor phase in the center during the relatively slow drying process which holds water in the granule for a longer time period. Conventional drying conditions for drying of frozen gas-injected coffee extracts at 0.1 to 0.8 millibars are generally 105 to 120° C. for up to 3 hours, then 90° C. for 3 to 4.5 hours and finally 60° C. for 4.5 to 5.5 hours. The initial high temperature forces water out of the granule quickly. If drying of the frozen coffee granules of the invention is carried out under these conditions, frozen coffee granules may become puffed up, resulting in a very friable product with a relatively low density, generally less than about 0.3 g/cc and typical of conventional freeze-dried coffee.

The present freeze-dried granules show two distinct features. As best shown in FIG. 5, the outer surface layer of 100–200 micron thickness has elongate pores of 2–10 microns in diameter and 5–50 microns in length which extend perpendicular to the surface of the granule. These pores are much smaller and thinner than those in conventional freeze-dried coffee. The inner core layer is glassy coffee matrix, which has pores of less than 0.1 micron present and also has a few large voids. These two distinct layers decrease and localize the solubility of the product relative to conventional freeze-dried coffee. The outer surface layer solubilizes rapidly, in a matter of a few seconds, while the inner core layer dissolves relatively slowly, i.e., typically the entire dissolution takes at least 20 seconds.

After preparation of the freeze-dried coffee granules, they are then combined with a particulate foaming creamer by dry-blending. Other techniques, such as agglomeration may also be utilized. Such foaming creamers may be dairy-based or non-dairy based or both, and the term "creamer" is used herein in its broad sense of whitener and not in a narrow sense of being a dairy product or even dairy based. Foaming creamers include protein, lipid and filler as essential components. In addition, foaming creamers include either an incorporated gas or carbonation system, or both, for generating a gas when the creamer is dispersed in the hot beverage liquid. Suitable gas-injected foaming creamers are disclosed in U.S. Pat. No. 4,438,147, U.S. Pat. No. 4,736,527 and U.S. Pat. No. 4,798,040, the disclosures of which are incorporated herein by reference. Suitable foaming creamers containing a carbonation system are disclosed in U.S. Pat. Nos. 5,721,003 and 5,780,092, the disclosures of which are incorporated herein by reference and in published German Patent Application No. 4,407,361 A1 published on Sep. 7, 1995.

The particulate dry mix composition may include other components such as a sweetener which may be a natural or artificial sweetener, one or more flavor components, fillers and bulking agents. Suitable natural sweeteners include corn syrup solids or other sugar sweeteners such as sucrose, fructose, lactose, and maltose. Suitable fillers or bulking agents include carbohydrates such as maltodextrins, polydextrine, lactose, and the like.

The resultant instant particulate dry mix composition, upon reconstitution in water, forms a cappuccino beverage with surface foam having a marbled appearance which simulates the marbled appearance of authentic cappuccino foam. Such marbled appearance may be defined as a foam which is at least 50% brown streaks, spots or swirls, in a yellowish brown to white foam matrix.

The instant particulate dry mix composition formed in accordance with the present invention typically includes 10 to 25% freeze-dried coffee prepared according to the method of the invention, 10 to 70% of a foaming creamer, a natural sugar type sweetener in an amount of about 100 to 500% based on the weight of the coffee or 1 to 3% of an artificial sweetener based on the weight of the coffee. The instant particulate dry mix beverage composition may further include a bulking or filler agent in an amount of 100 to 300% based on the weight of the coffee and one or more flavors in an amount of 1 to 3% based on the weight of the coffee.

A typical cappuccino beverage prepared using the instant particulate dry mix beverage composition of the invention is prepared by adding 12 grams of the composition to 150 milliliters of water at about 85° C. The beverage is then stirred for about 1 minute. The resulting beverage has a surface foam having a marbled appearance.

The table below shows a comparison of the foam layer of reconstituted cappuccino beverages prepared using the method of the invention with three different commercially available instant cappuccino beverages. Samples were prepared by dissolving the instant cappuccino powders in hot water in individual cups and stirring. Photographs of the foam layers were then taken using an Olympus Camedia digital camera C-1400L placed on a tripod at a distance of 9–10 centimeters above each sample cup. A close-up lens 4x was utilized. The resultant photographs were then evaluated using a histogram to determine the percentage of marbling of the foam layer.

| Sample | Marbling (%) |
| --- | --- |
| No. 1 - Freeze dried coffee prepared in accordance with the invention, creamer comprising skim milk and coconut oil | 86.2 |
| No. 2 - Freeze dried coffee prepared in accordance with the invention, creamer comprising skim milk and coconut oil | 79.3 |
| No. 3 - Commercially available German product - Nestle Zart | 0.0 |
| No. 4 - Commercially available German product - Nestle Kräftig | 0.0 |
| No. 5 - Commercially available German product - Jacobs Cafe Zauber | 96.5 |

Test samples 1 and 2, which are cappuccino beverages prepared in accordance with the invention, produced beverages having brown foam swirls throughout 86 and 79 percent, respectively, of the upper foam layers. In contrast, samples 3 and 4, which were beverages prepared using currently marketed instant cappuccino powders exhibited a foamed upper surface which was substantially white and substantially uniform in color. Sample 5, prepared using yet another commercially available instant cappuccino powder, yielded a beverage in which nearly 100% of the foam layer was uniformly brown.

The invention is further illustrated in the examples which follow.

EXAMPLE 1

A coffee extract of 60% concentration is made by adding warm (40° C.) water to spray-dried coffee powder. The extract is then passed through a de-aerator to devoid it of entrapped air and frozen into slabs of −40 to −50° C. temperature by pouring the de-aerated extract on a freezing belt. Freezing is conducted by air blasting the belt from top and bottom at freezing rates of about 2.5° C./minute. The frozen granules are ground into frozen granules with particle size of about 2 mm and are placed into trays which are transferred into a freeze drier for drying.

The granules are then dried in a pilot scale Atlas freeze drier for 7–8 hours at 60° C. and at an absolute pressure of about 0.1–0.8 millibars. The resulting freeze dried coffee granules have a density of about 0.38 and are characterized by a two-layer structure as described above.

EXAMPLE 2

An instant dry mix coffee beverage composition is prepared with the high density freeze dried coffee product of Example 1 according to the following formulation:

| Ingredient | Parts by Weight |
| --- | --- |
| Coffee | 16 |
| Foaming Creamer* | 50 |
| Sucrose | 33.5 |
| Flavors | 0.5 |

*The foaming creamer is 68% skim milk, 30% coconut oil, silicon dioxide flow agent and sodium dihydrogen orthophosphate for stabilization of the protein structure during dissolution.

The composition is prepared by weighing each of the particulate dry ingredients into a mixer and dry mixing for 10 minutes in a Loedigge Blender.

EXAMPLE 3

To twelve grams of the dry mix composition of Example 2 in a beaker is added 150 ml water at 85° C. The beverage is stirred gently with a spoon for 1 minute. The resulting beverage has foam at its surface, and the upper surface is marbled and non-uniform in color with mixed colors comprising brown streaks, spots and swirls in a yellowish to white matrix.

EXAMPLE 4

Example 3 is repeated except that the dry mix product is formulated from the following ingredients:

| Ingredient | Parts by Weight |
| --- | --- |
| Coffee Product of Example 2 | 13 |
| Foaming Creamer* | 53 |
| Sucrose | 25.5 |
| Lactose | 8 |
| Flavors | 0.5 |

*Same as Example 2.

The resulting beverage has a foam having generally the same marbled appearance as the foam of the beverage of Example 3.

Although the invention has been described in considerable detail with respect to preferred embodiments thereof, variations and modifications will be apparent to those skilled in the art without departing from the spirit and scope of the invention as set forth in the claims.

What is claimed is:

1. An instant dry mix particulate coffee beverage composition for producing a cappuccino beverage having surface foam having a marbled appearance, the composition comprising:

a particulate foaming creamer, and freeze-dried coffee granules having an outer surface layer which is rapidly soluble and an inner core layer which is slowly soluble said outer surface layer comprises elongate voids extending generally perpendicularly to the surface of the coffee granule.

2. An instant dry mix coffee beverage composition according to claim 1 wherein said inner core layer comprises a glassy structure.

3. An instant dry mix coffee beverage composition according to claim 1 further comprising a sweetener and flavoring.

4. An instant dry mix coffee beverage composition according to claim 1 wherein the freeze-dried coffee granules have a density of at least 0.3 g/cc.

5. An instant dry mix coffee beverage composition according to claim 4 wherein the freeze dried coffee granules have a density of 0.3 to 0.45 g/cc.

6. An instant dry mix coffee beverage composition according to claim 1 comprising from 10–40% by weight of said foaming creamer and 90–60% by weight of said coffee granules.

7. An instant dry mix coffee beverage composition according to claim 6 further comprising a sugar sweetener in an amount of from 100 to 300% by weight based on the weight of said coffee granules.

8. An instant dry mix coffee beverage composition according to claim 6 further comprising an artificial sweetener in an amount of from 1 to 3% by weight based on the weight of said coffee granules.

* * * * *